(12) United States Patent
Jywe et al.

(10) Patent No.: US 7,773,234 B2
(45) Date of Patent: Aug. 10, 2010

(54) MEANS FOR MEASURING A WORKING MACHINE'S STRUCTURAL DEVIATION FROM FIVE REFERENCE AXES

(75) Inventors: Wen-Yuh Jywe, Huwei Township, Yunlin County (TW); Chien-Hung Liu, Longjing Township, Taichung County (TW); Yi-Tsung Li, Sansia Township, Taipei County (TW); Tung-Hsien Hsieh, Dajia Township, Taichung County (TW); Tung-Hui Hsu, Kaohsiung (TW); Hung-Shu Wang, Taoyuan (TW)

(73) Assignee: National Formosa University, Yunlin County (TW)

( * ) Notice: Subject to any disclaimer, the term of this patent is extended or adjusted under 35 U.S.C. 154(b) by 187 days.

(21) Appl. No.: 12/206,026

(22) Filed: Sep. 8, 2008

(65) Prior Publication Data

US 2010/0060906 A1 Mar. 11, 2010

(51) Int. Cl.
*G01B 11/14* (2006.01)

(52) U.S. Cl. .................................................. 356/614
(58) Field of Classification Search ................. 356/614, 356/622; 250/559.29
See application file for complete search history.

(56) References Cited

U.S. PATENT DOCUMENTS 7,455,569 B2 * 11/2008 Schafer et al. ................. 451/11

* cited by examiner

*Primary Examiner*—Roy Punnoose
(74) *Attorney, Agent, or Firm*—Chun-Ming Shih

(57) ABSTRACT

Means for measuring a working machine's structural deviation from five reference axes includes a main sensing body bonded with a main axis of the working machine (or controlled to revolve), and a lighting unit set around the main sensing body to circle about the main sensing body with a fixed radius (or the lighting unit radiates a light on the main sensing body from that radial distance and circles along with the main sensing body) such that as soon as the main sensing body has detected an optical signal, it is converted to an error signal informing of the working machine's structural deviation in two or three dimensional displacement.

20 Claims, 14 Drawing Sheets

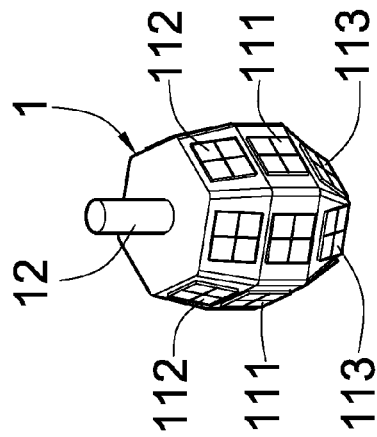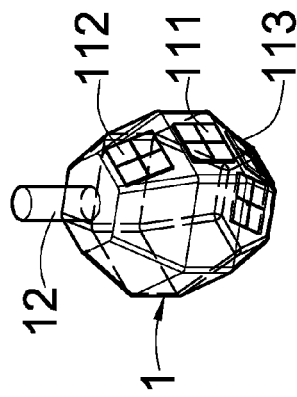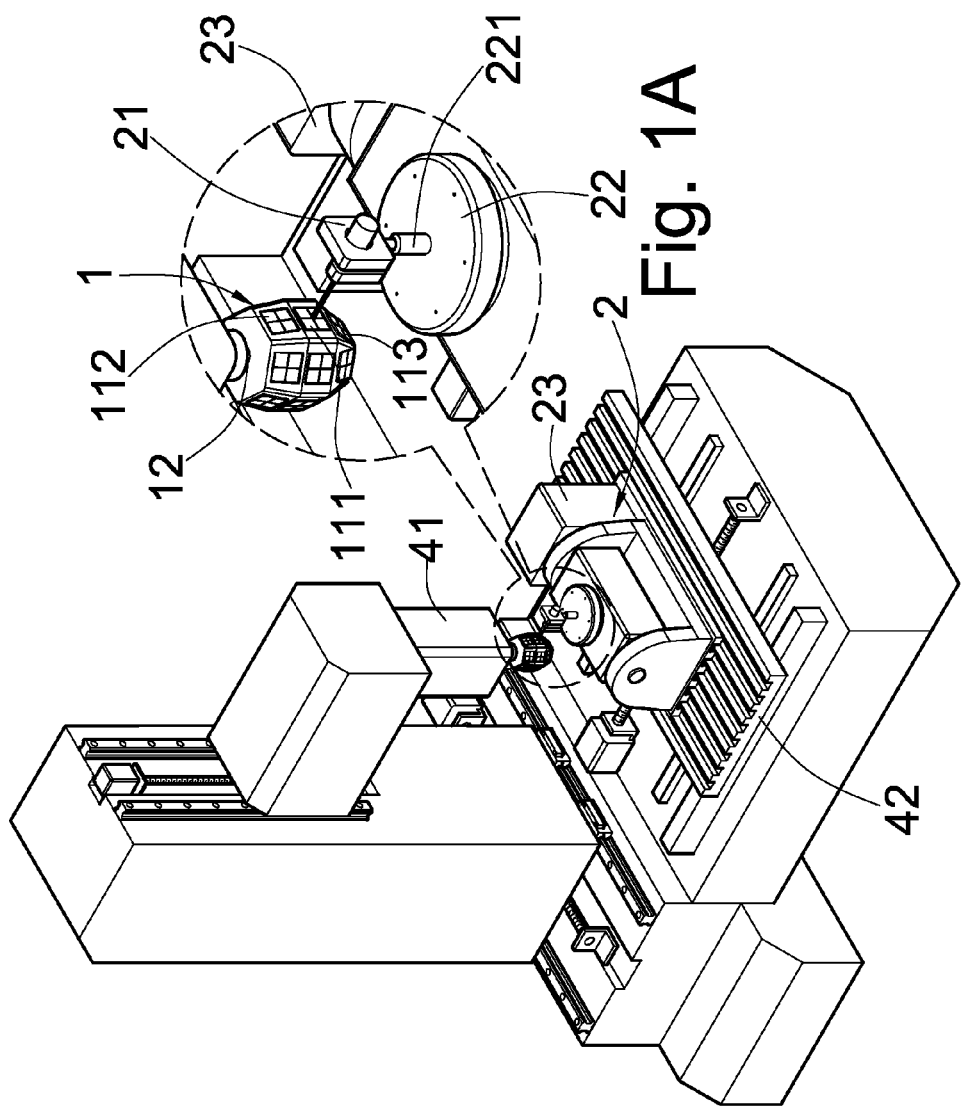

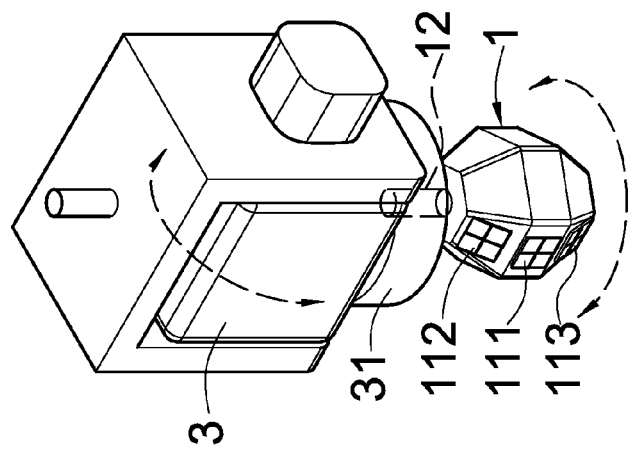
Fig. 5
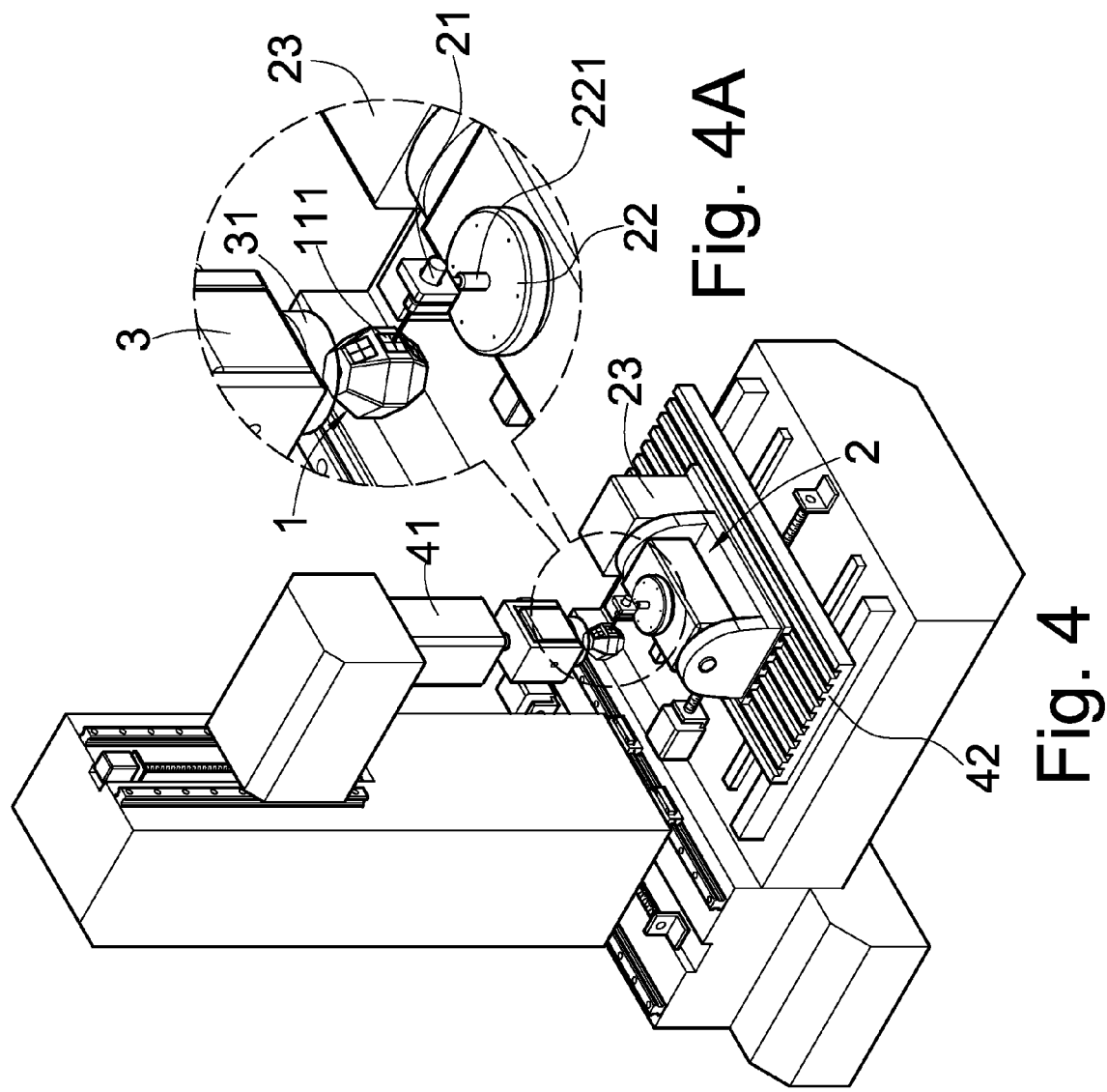
Fig. 4A
Fig. 4

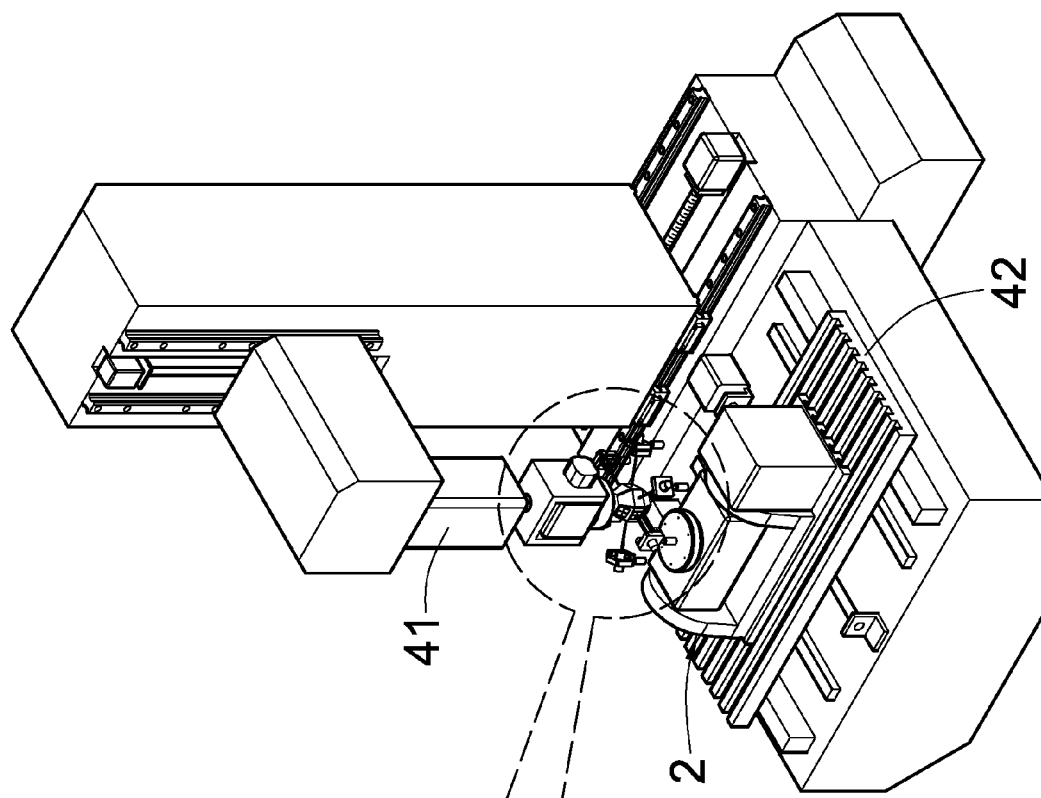
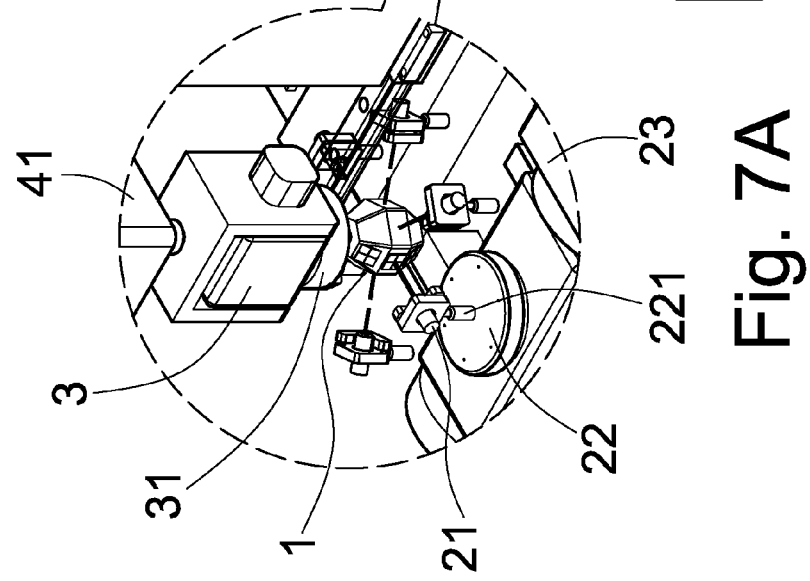
Fig. 7A
Fig. 7

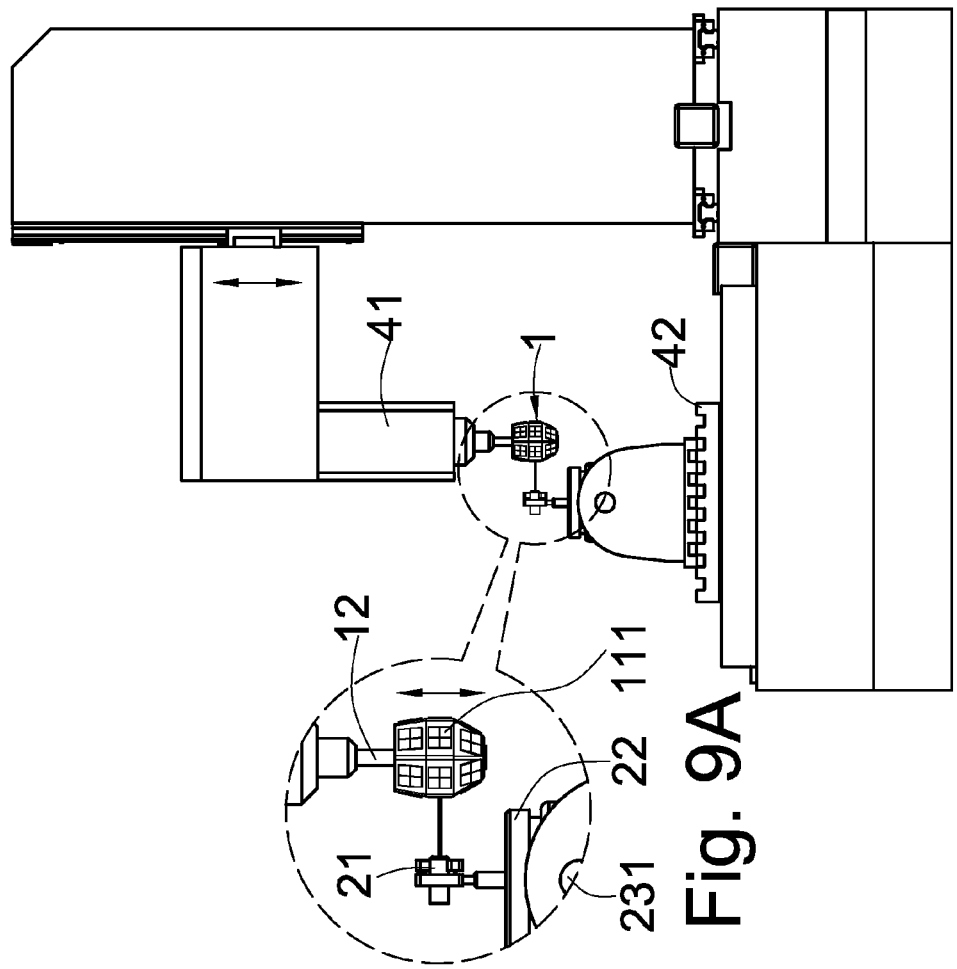
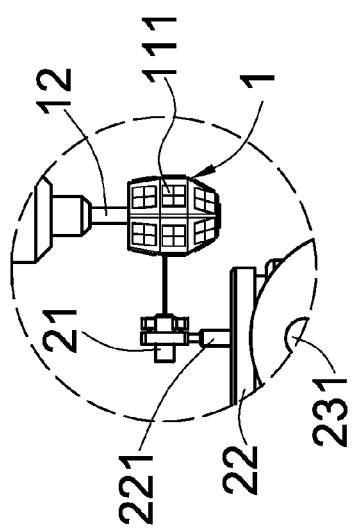
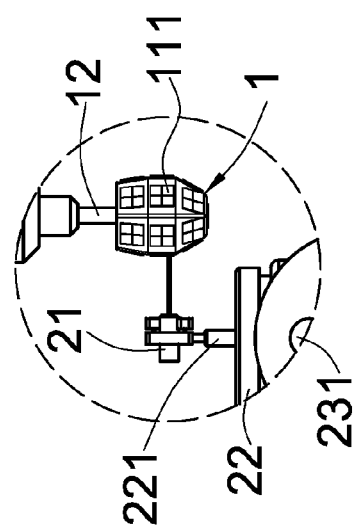

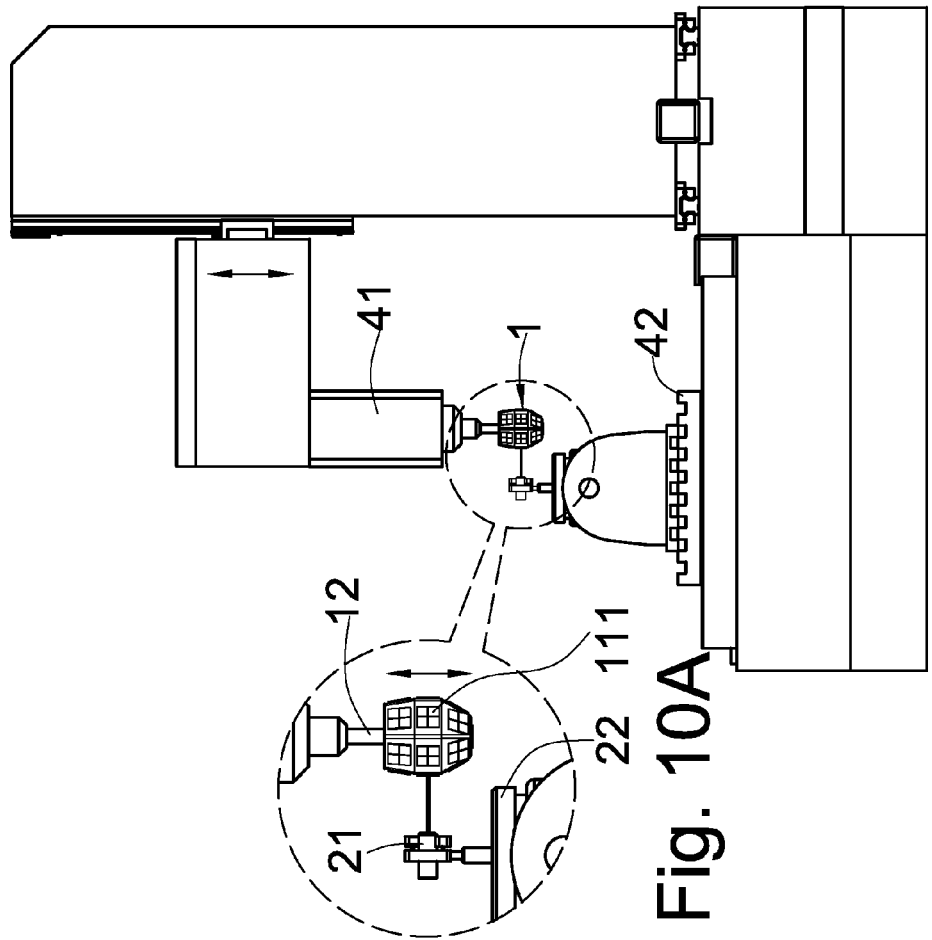
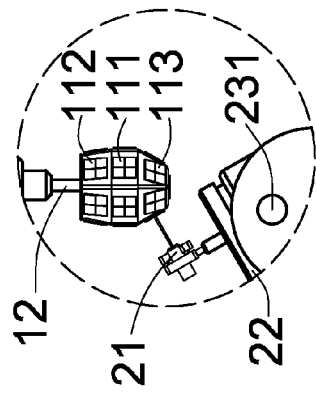
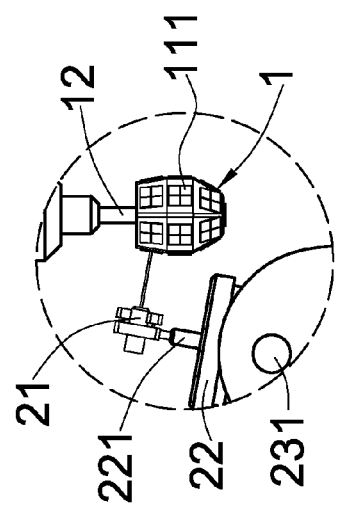

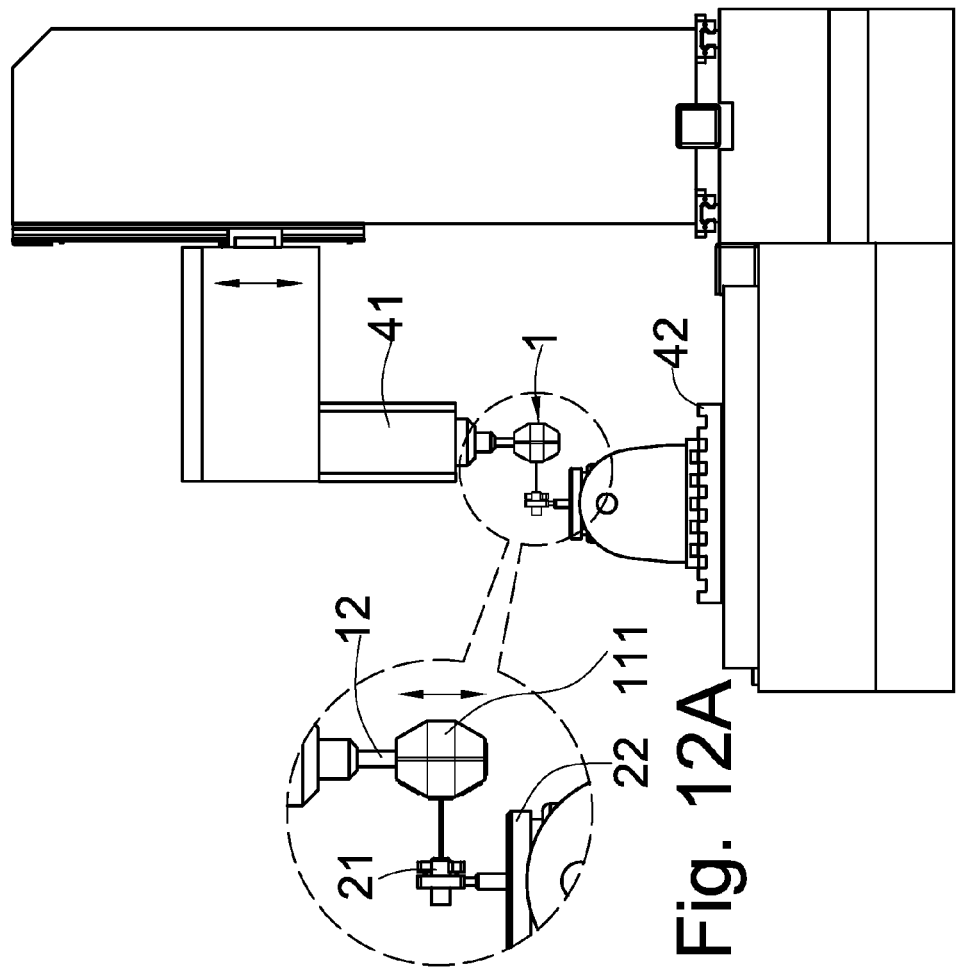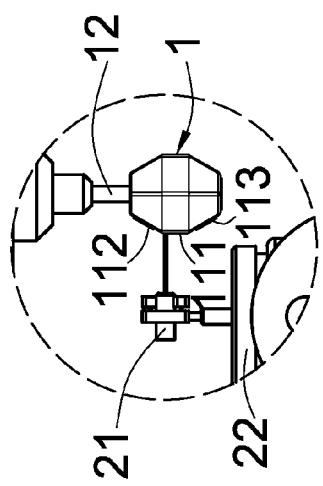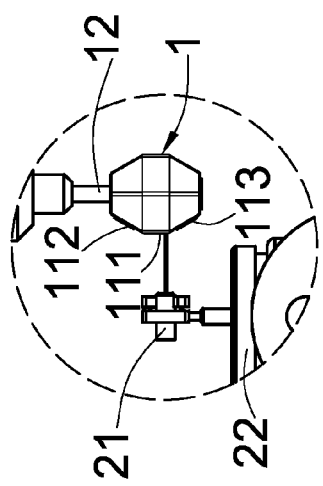

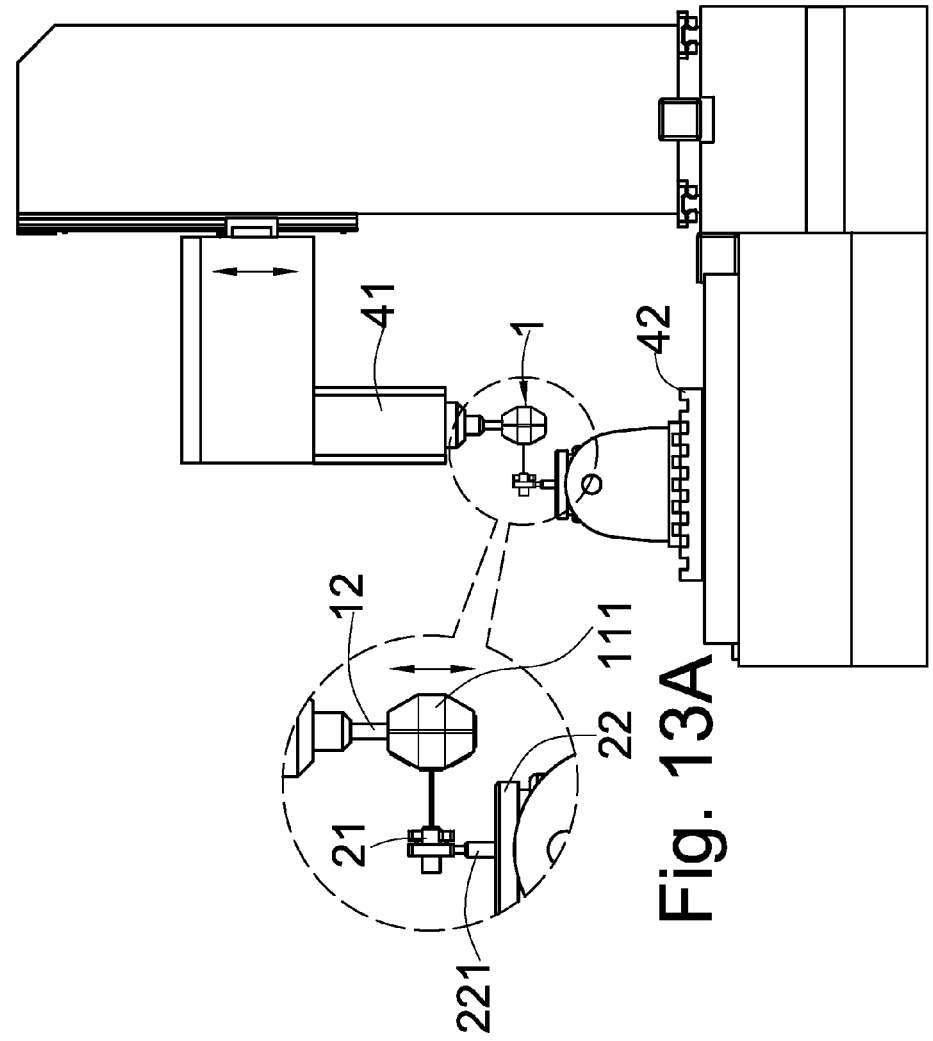
Fig. 13
Fig. 13A
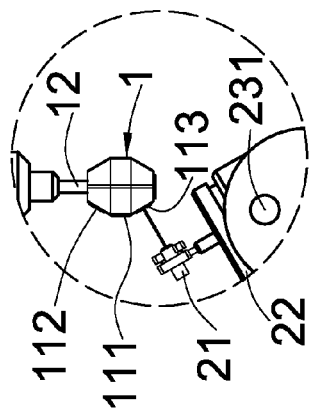
Fig. 13B
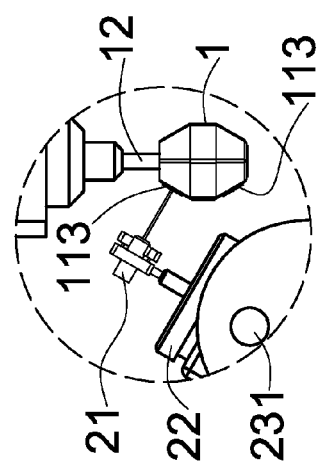
Fig. 13C

MEANS FOR MEASURING A WORKING MACHINE'S STRUCTURAL DEVIATION FROM FIVE REFERENCE AXES

BACKGROUND OF THE INVENTION

1. Field of the Invention

The present invention relates to means for measuring a working machine's structural deviation from five reference axes, wherein a lighting unit is provided to circle about a main sensing body keeping a defined radial distance such that the main sensing body is able to detect a working machine's structural deviation from five reference axes in two or three dimensional displacement when receiving an error signal from the lighting unit.

2. Description of the Prior Art

For upgrading the quality of a working machine, there are two choices can be employed. To improve the whole structure of the machine, or to measure the structural error thereof and feeding back the measured error for Nc-code compensation. The former method takes time and hard to ralize3 unless a large investment is introduced into which seems economically difficult; the latter method is though easy, simple and economical, yet techniques of making five or more reference axes structural calibration is unmatured at present. Use of the interometer calibration for a working machine needs a complicated installation. The Automated Precision Inc. has present a multi-reference axes measuring system which being only effective for linear axes with a poor precision and high cost. Messrs. Agilent Technologies and Renishaw PLC have presented a measuring technique in which an expensive light path is needed yet still unable to carry out simultaneous calibration in five reference axes whose standard is not established in TSO 230-2.

For these defects noticeable on the prior art, an improvement is seriously desired. The inventor of the present invention has dedicated great efforts for years to studying and rectifying these defects and come up with a novel means for measuring a working machine's structural deviation from five reference axes as to be described hereinafter.

SUMMARY OF THE INVENTION

The essential object of the present invention is to provide a non-contacting, high-resolution means for measuring a working machine's structural deviation from five reference axes.

To achieve the aforesaid object, the present invention provides a main sensing body and a lighting unit.

The main sensing body is bonded with a holding main axis of a working machine to be driven to revolve, and having a plurality of differently inclined sensor elements (PSD) annularly disposed about the holding main axis. Each sensor element contains at least a first, a second and a third sub element. The first one is parallel to the main holding axis. The second and third ones are respectively disposed at two sides of the first one and each making an inclined angle with the first one.

The lighting unit, which being entrained on a working platform of the working machine, has a light source, a revolving member to revolve the light source in a first direction of the main sensing body, and a dynamo to connect the light source with the revolving member to revolve in a second direction of the main sensing body.

BRIEF DESCRIPTION OF THE DRAWINGS

Other objects and purposes of the invention will be apparent to persons acquainted with apparatus of this general type upon reading the following specification and inspection of the following accompanying drawings.

FIGS. 1 and 1A are perspective views of the means for measuring a working machine's structural deviation from five reference axes in a first embodiment of the present invention.

FIG. 2 is a perspective view of the main sensing body in a first embodiment.

FIG. 3 is a perspective of the main sensing body in a second embodiment.

FIGS. 4 and 4A are perspective views of the means for measuring a working machine's structural deviation from five reference axes in a second embodiment of the present invention.

FIG. 5 is a perspective view of the driving device.

FIGS. 7 and 7A are perspective views illustrating an incident light of the lighting unit of FIG. 4 on the main sensing body.

FIGS. 9, 9A, 9B and 9C are schematic views showing a measurement with respect to three linear axes and one rotational axis.

FIGS. 10, 10A, 10B and 10C are schematic views showing a measurement with respect to three linear axes and two rotational axes.

FIGS. 12, 12A, 12B and 12C are schematic views showing a measurement with respect to three linear axes and one rotational axis in a second embodiment.

FIGS. 13, 13A, 13B and 13C are schematic views showing a measurement with respect to three linear axes and two rotational axes in a second embodiment.

DETAILED DESCRIPTION OF THE PREFERRED EMBODIMENT

Figure 6:
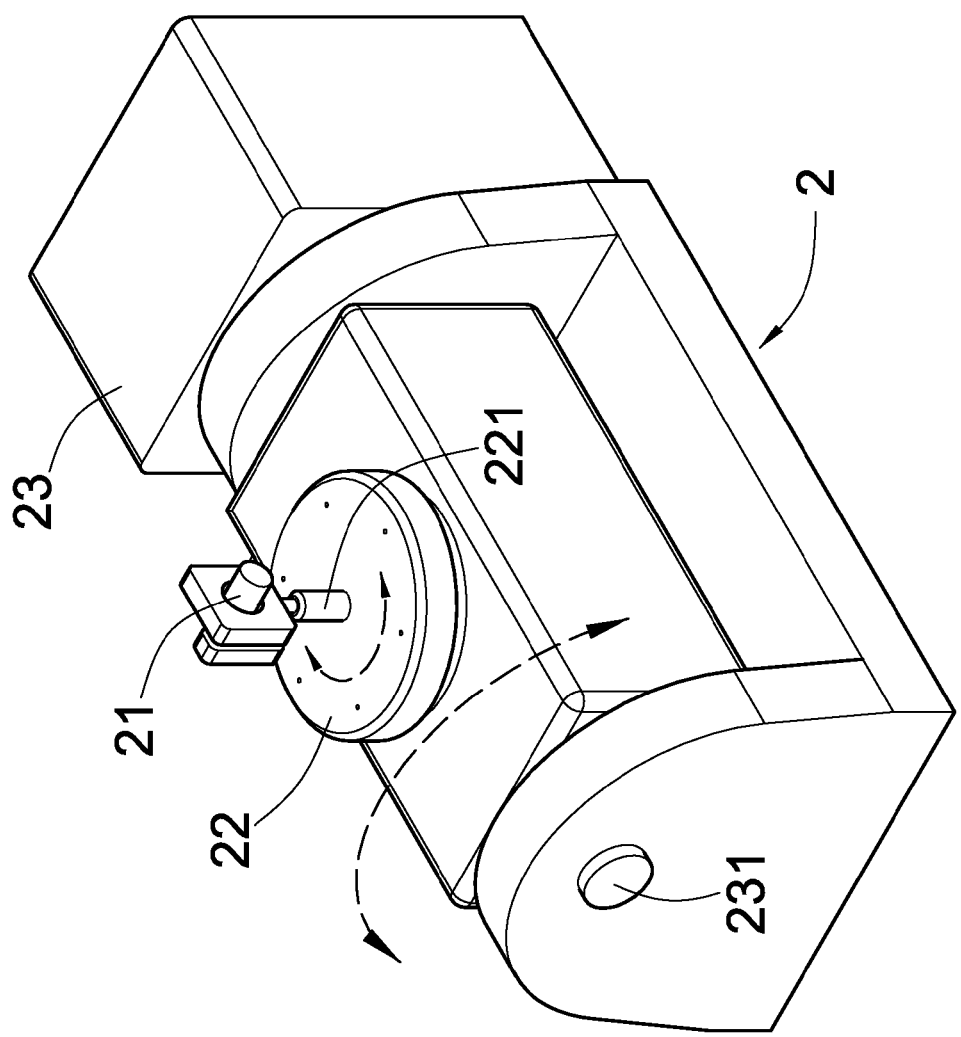
FIG. 6 is a perspective view of the lighting unit.

Referring to FIG. 1, FIG. 1A and FIG. 6, the measuring means provided by the present invention essentially comprises a main sensing body bonded with a main axis 41 of the working machine, and a lighting unit 2 disposed to circle about the main sensing body 1 keeping a defined radial distance there from such that the main sensing body 1 is able to detect an optical error signal about the working machine's structural deviation from five reference axes in two or three dimensional displacement.

Referring to FIG. 4, FIG. 4A and FIG. 6, the present invention provides a measuring means comprising a main sensing body 1 bonded with a main axis 41 of a working machine to be controlled revolution, and a lighting unit 2 disposed apart from the main sensing body 1 a distance to radiate it and circle along with the main sensing body 1 about the main axis 41 with that distance as circling radius such that the main sensing body 1 is able to detect an optical error signal about the working machine's structural deviation from five reference axes in two or three dimensional displacement.

As shown in FIG. 2, the main sensing body 1 is bonded with the main axis 41 of the working machine, and being controlled to revolve. The main sensing body 1 has a plurality of differently inclined sensor elements disposed annularly about a holding axis 12. Each sensor element has at least several first sub-elements 111, several second sub-elements 112 and several third sub-elements 113. The first sub-elements 111 are parallel to the holding axis 12, and the second and third sub-elements 112 and 113 are respectively disposed at upper and lower sides of the first sub-elements 111 with an inclination therebetween.

As shown in FIG. 6, the main lighting body 1 is entrained on a working platform 42 of the working machine and comprises a light source 21, a revolving member 22 to cause revolution of the light source 21 in a first direction of the main sensing body 1, and a dynamo 23 to bond the light source 21 with the revolving member 22 thereby causing revolution of the light source 21 in a second direction of the main sensing body 1. The light source 21 is a laser. The lighting unit 2 is set on the working platform 42 with the dynamo 23 such that the light source 21 and revolving member 22 are able to rock about a rocking center in the second direction with a predetermined rocking angle and frequency under driving of the dynamo 23.

For more understanding the present invention, please refer to FIG. 4 and FIG. 4A which is another embodiment of the present invention, the measuring means includes a main sensing body 1 composed of more than three sensor elements to configurate a polyhedron or a convex polyhedron. The sensor elements may be longitudinally or transversely disposed with an equal angle span on the exterior surface of the main sensing body 1. The transverse disposed angle may or may not be equal to the longitudinal one. Further to describe in detail, the sensor element comprises at least a first sub-element 111, a second sub-element 112 and a third sub-element 113, wherein the second sub-element 112 and the third sub-element 113 are respectively disposed on upper and lower sides of the first sub-element 111 forming an inclined angle with the first sub-element 111 so as to configurate into a polyhedronal main sensing body 1.

Figure 14:
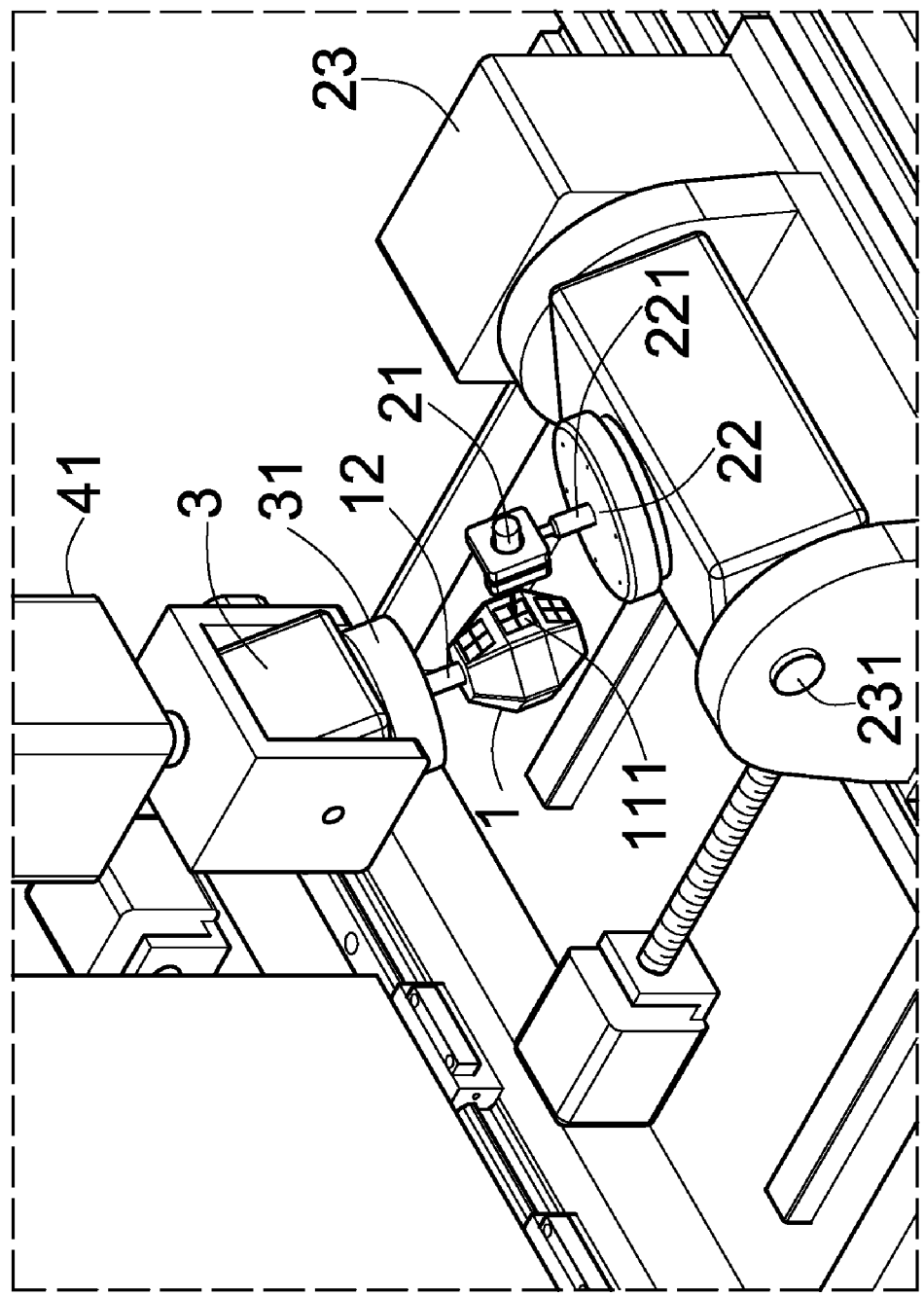
FIG. 14 through FIG. 16 are schematic vies showing a measurement with respect to three linear axes and two rotational axes in a second embodiment.
Figure 15:
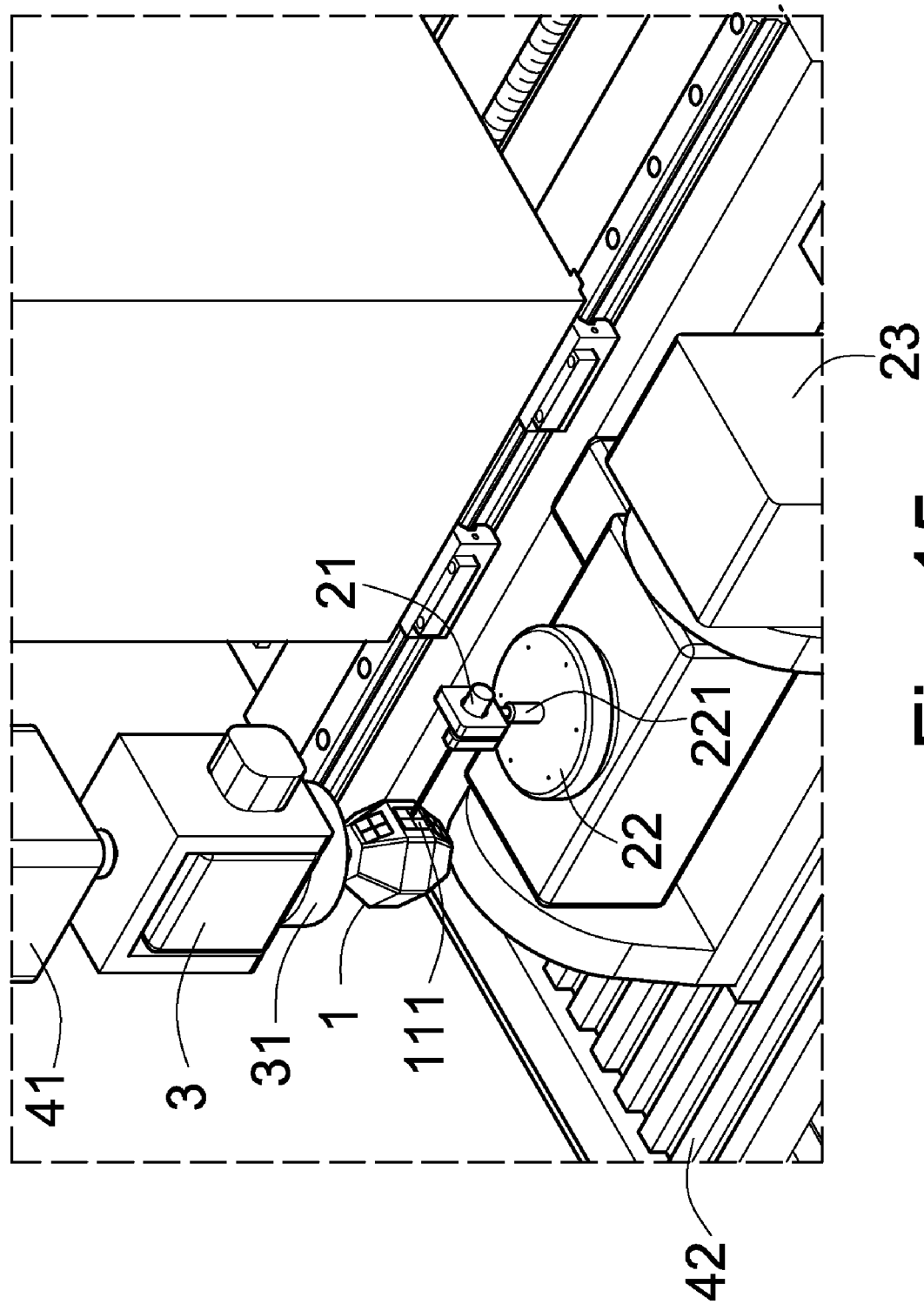
Figure 16:
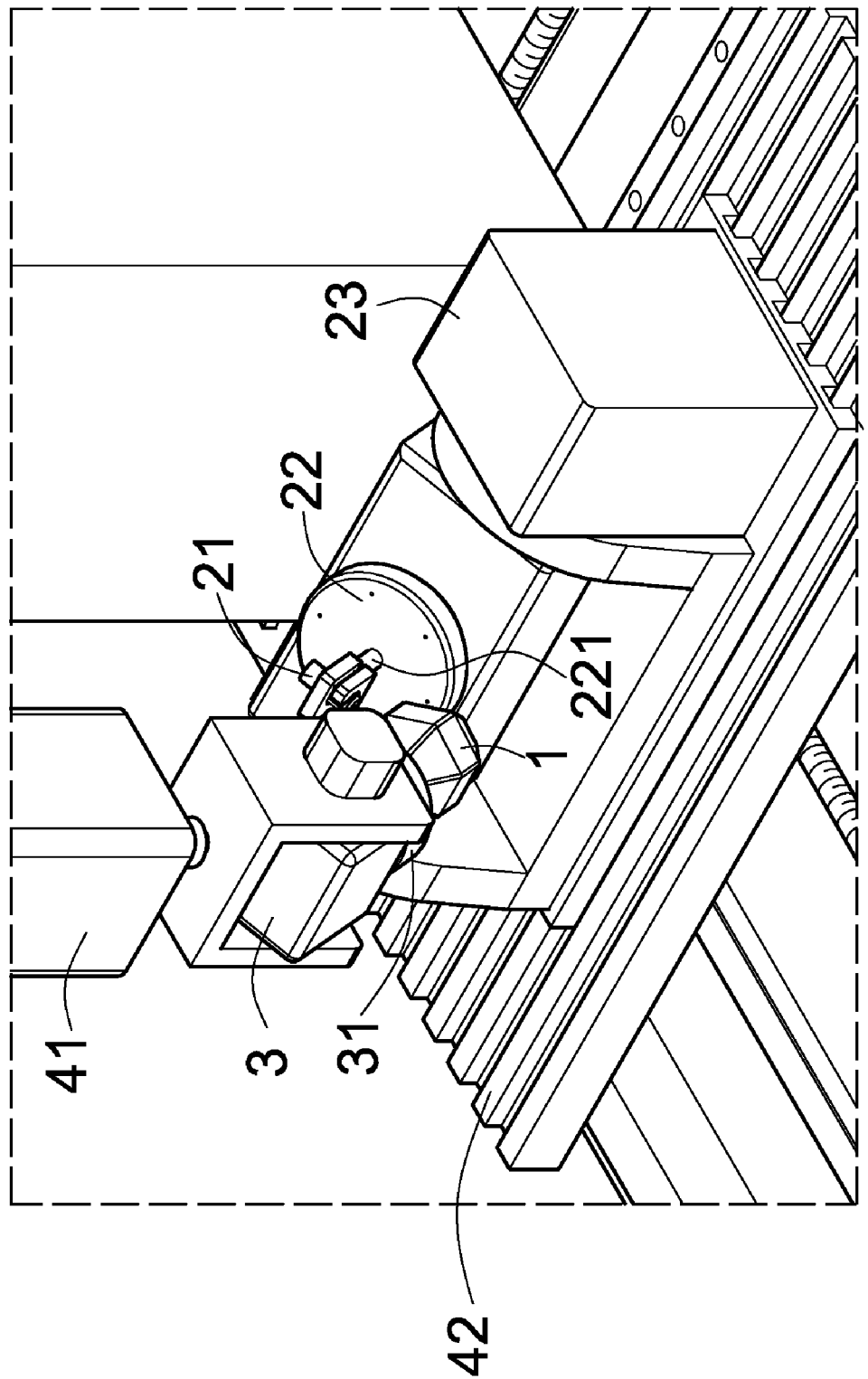
Figure 17A:
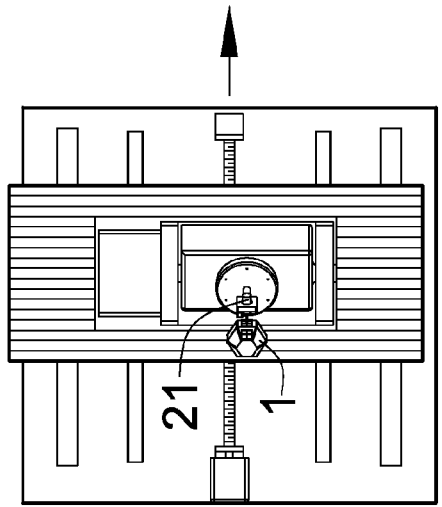
FIGS. 17A through 17E is a flow chart of a measurement with respect to three linear axes and two rotational axes in a second embodiment.
Figure 17B:
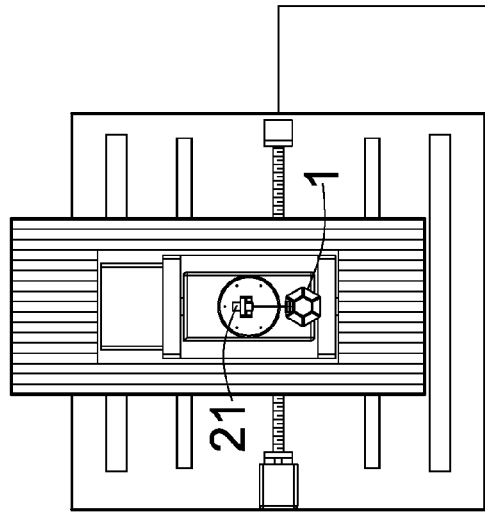
Figure 17C:
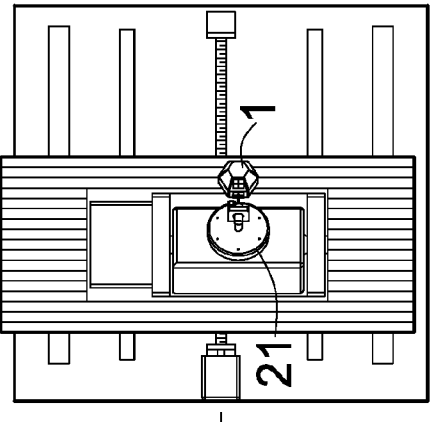
Figure 17D:
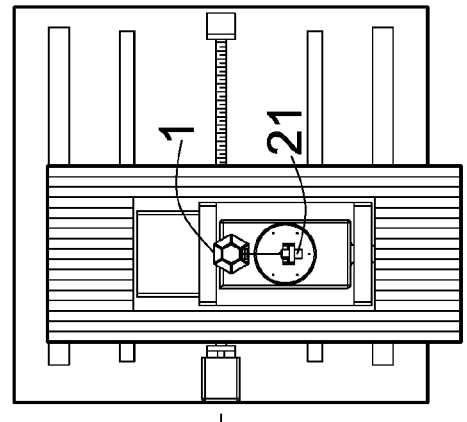
Figure 17E:
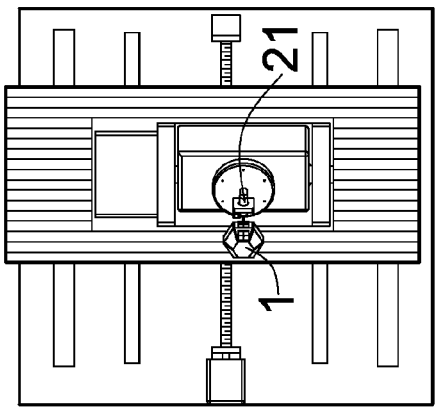

As shown in FIG. 4, FIG. 4A and FIG. 5, the main sensing body 1 is further bonded with a driving device 3 which being conjoined to the main axis 41 of the working machine. The driving device 3 is able to drive the main sensing body 1 with its motor 31 to rock with a predetermined angle. By so, the main sensing body 1 can rock with respect to a rocking center a predetermined angle under driving of the driving device 3. As the main sensing body 1 revolves an angle by driving of the motor 31, the lighting unit 2 is also driven by revolving member 22 so as to cause an optical signal output of the light source 21 vertically radiate the sensor elements when the main sensing body 1 revolves. As shown in FIG. 1 and FIG. 1A, when the main sensing body 1 is driven by the driving device 3 to revolves, the lighting unit 2 is also driven by the revolving device 22 and the dynamo 23 so as to vertically radiate an optical signal output to the sensor elements in accordance with the revolution and rocking of the main sensing body 1 (see FIG. 14 and FIG. 16).

When the main sensing body 1 is bonded to the main axis 41 of the working machine with an instrument tool (or the driving device 3), the main sensing body 1 is at a fixed end, while the lighting unit 2 entrained on the working platform 42 or the working machine is at a movable end. As shown in FIG. 7 and FIG. 7A, the lighting unit 2 radiates a light to the sensor elements of the main sensing body 1 preparing for the next step to follow. Finally measuring of the working machine's structural deviation from five reference axes is performed by the main sensing body 1.

The steps of installing the main sensing body 1 and the lighting units 2 for measurement are as follow;

Bonding the main sensing body 1 to the main axis 41 of the working machine with an instrument tool (or the driving device 3);

Entraining the lighting unit 2 on the working platform 42;

Adjusting the light output from the lighting unit 2 to be able to vertically radiate the sensor elements (for example, the first sensor sub-element 111);

Adjusting the initial position of the incident light to be able to vertically radiate the sensor elements (for example, the first sensor sub-element 111);

Setting one of the sensor elements which receives the incident light as an initial point; and Performing the predetermined measurement procedures.

Figure 8:
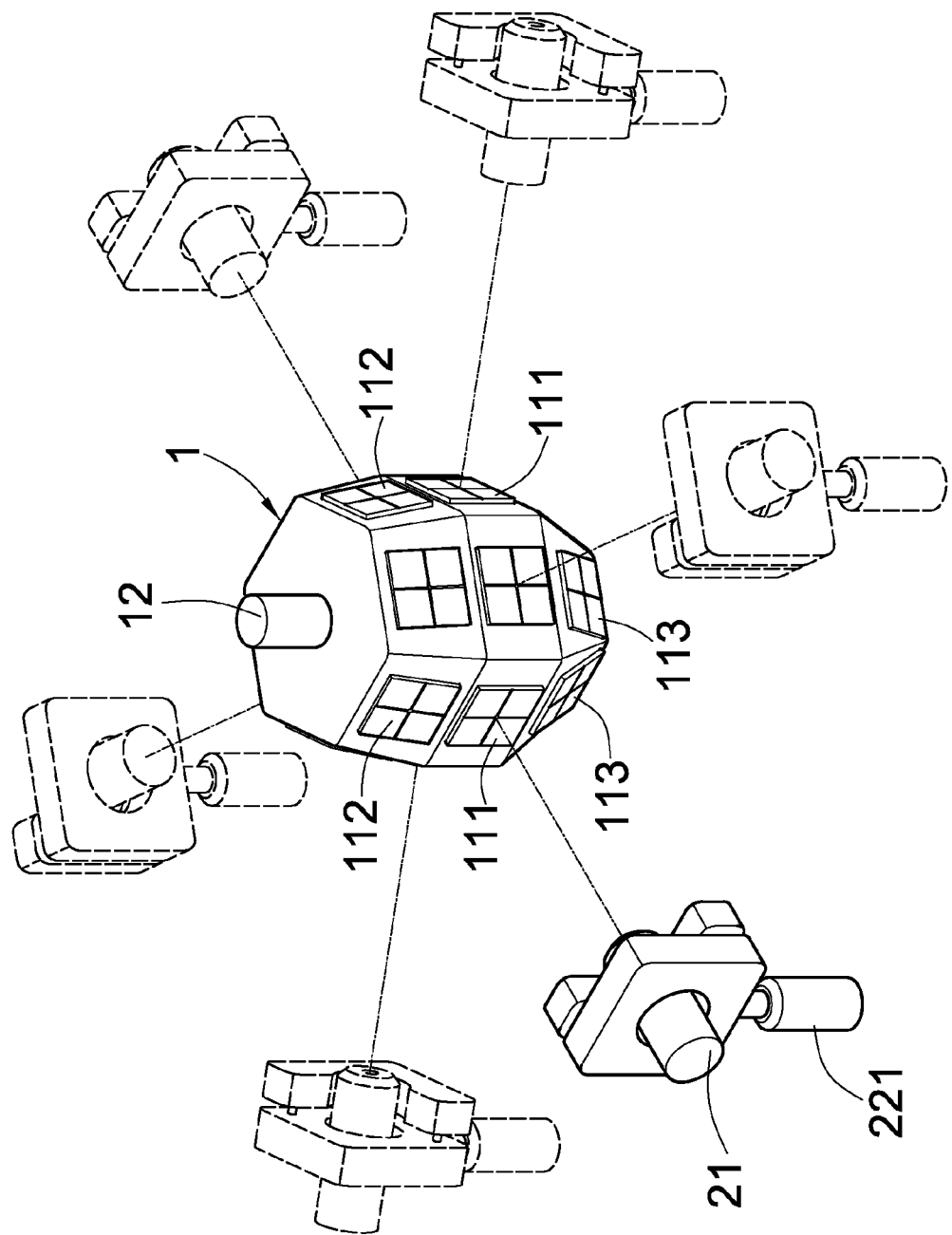
FIG. 8 is a schematic view showing a measurement with respect to two linear axes and one rotational axis.
Figure 11A:
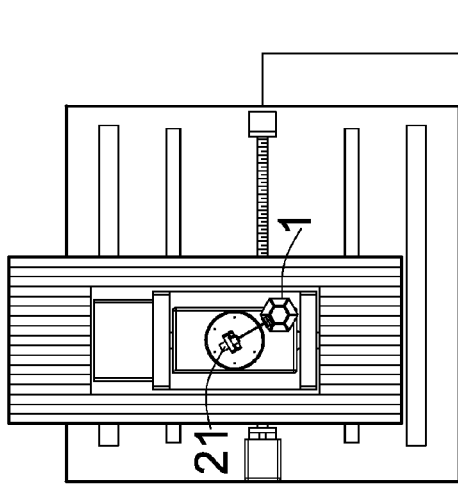
FIGS. 11A through 11F is a flow chart of a measurement with respect to two linear axes and one rotational axis in a second embodiment.
Figure 11D:
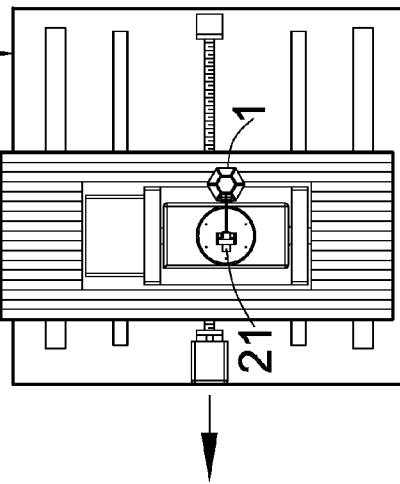
Figure 11B:
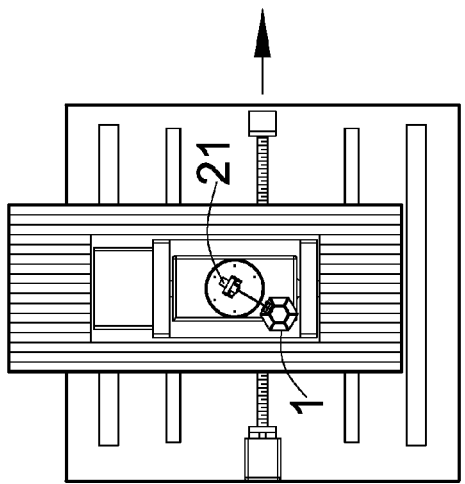
Figure 11E:
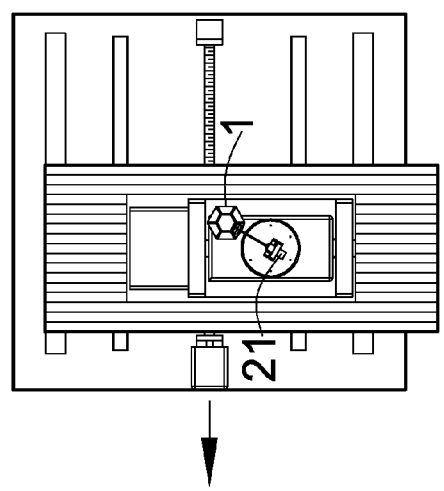
Figure 11C:
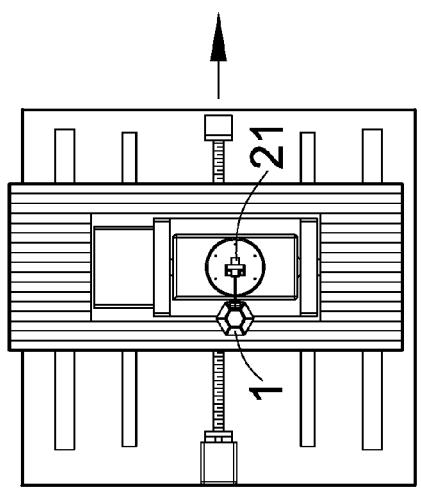
Figure 11F:
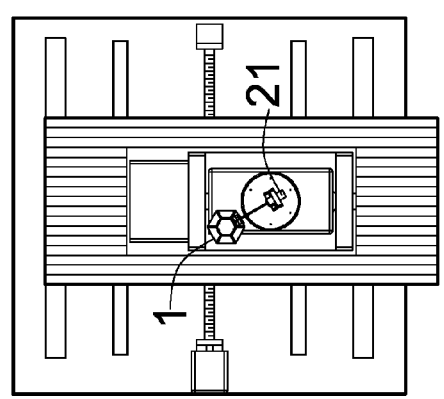

Meanwhile, as shown in FIG. 2 and FIG. 8, the present invention includes a measurement of structural deviation from two linear axes and one rotational axis. Provided are two linear axes including X axis and Y axis and a vertical axis 221 of the revolving member 22 in a measuring passage, the steps of stationary measuring method (the main sensing body 1 being fixed onto the main axis 41) are as follows: radiating the main sensing body 1 (the main axis 41 being kept stationary) with the incident light from the lighting unit 2 on the first sensor sub-element 111; revolving the light source 21 in the first direction with the vertical axis 221 of the revolving member; revolving the lighting unit 2 about the main sensing body 1 with a fixed distance as a circling radius (mutual movement of X, Y axes) to radiate light on first to six surfaces of the first sub-element 111 such that the first sub-element 111 output a signal informing the position of the incident light.

Next, as shown in FIG. 2, FIG. 8, FIG. 9 and FIG. 9A, the present invention provides a measurement means of structural deviation from three linear reference axes and one rotational reference axis with a first directional measuring passage including three linear axes X, Y, Z and one vertical axis 221 of the revolving member. The steps of stationary (the main sensing body 1 fixed to the main shaft 41 with a clamping tool) measuring method are as follows: radiating the main sensing body 1 (the main axis 41 being kept stationary) with the incident light from the lighting unit 2 on the first surface of the first sensor sub-element 111; revolving the light source 21 to the first direction with the vertical axis 221 of the revolving member 22; circling the lighting unit 2 about the main sensing body 1 with a fixed distance as a circling radius (mutual movement of X, Y axes)(see FIG. 8); at the same time reciprocating up and down the main axis 41 along with the main sensing body 1 (up and down movement of Z axis) so as to radiate light on the first to six surfaces of the first sub-element 111 such that the first sub-elements 111 output a signal informing the position of the incident light (see FIG. 9B and FIG. 9C).

Meanwhile, as shown in FIG. 2, FIG. 8, FIG. 10 and FIG. 10A, the present invention provides a measurement means of structural deviation from three linear reference axes and two rotational reference axes. The measurement includes three linear axes X, Y, Z and two rotational axes including the vertical axis 221 of the revolving member 22 as a first directional passage and a horizontal axis 231 of the dynamo 23 on the working table 42 as a second directional passage. The steps of stationary (the main sensing body 1 fixed to the main shaft 41 with a champing tool) measuring method are as follows: radiating the main sensing body 1 (the main axis 41 being kept stationary) with the incident light from the lighting unit 2 on the first surface of the first sensor sub-element 111; revolving the light source 21 to the first direction with the vertical axis 221 of the revolving member 22; circling the lighting unit 22 about the main sensing body 1 with a fixed distance as a circling radius (mutual movement of X, Y axes)

(see FIG. 8); at the same time reciprocating up and down the main axis 41 along with the main sensing body 1 (up and down movement of Z axis, the main axis 41 horizontally moves forward and back ward according to actual needs) (FIG. 10B and 10C); the horizontal axis 231 of the dynamo 23 driving the light source 21 in the second direction and the vertical axis 221 of the revolving member 22 to rock with a predetermined angle and frequency in the first direction (the rocking center of the dynamo 23 rotates in the second direction); radiating the light to the arrayed first to third sensor sub-elements 111, 112 and 113 (a first surfaces of the first to third sensor sub-elements, a second surfaces of the first to third sensor sub-elements etc . . . ) such that all sensor elements output a signal informing the position of the incident light.

As shown in FIG. 3, FIG. 7 and FIG. 11A to 11F, the present invention provides a measurement means of structural deviation from two linear reference axes and one rotational reference axis in which two linear axes X and Y and the vertical axis 221 of the revolving member 22 are provided as reference axes with a measuring passage in the first direction. The steps of stationary (the main sensing body 1 is fixed to the main axis 41 with the driving device 3) measuring method are as follows: radiating the incident light of the lighting unit 2 on the first sensor sub-element 111 of the main sensing body 1; revolving the main sensing body 1 with the motor 31 of the driving device 3; the vertical axis 221 of the revolving member 22 revolving the light source 21 in the first direction; the lighting unit 2 radiating an incident light to the main sensing body 1 from a distance and circling along with and about the main sensing body 1 with that distance as a radius (mutual movement of X and Y axes)(see FIG. 11A to 11F) such that the first sensor sub-element 111 outputs a signal informing the position of the incident light.

Again, as shown in FIG. 3, FIG. 7, FIG. 11A to 11F, FIG. 12 and FIG. 12A, the present invention provides a measurement means of structural deviation from three linear reference axes and one rotational reference axis in which three linear axes X, Y and Z and the vertical axis 221 of the revolving member 22 are provided as reference axes with a measuring passage in the first direction. The steps of dynamic (the main sensing body 1 is fixed to the main axis 31 with the driving device 3) measuring method are as follows: radiating the incident light of the lighting unit 2 on the first sensor sub-element 111 of the main sensing body 1; revolving the main sensing body 1 with the motor 31 of the driving device 3; the vertical axis 221 of the revolving member 22 revolving the light source 21 in the first direction; the lighting unit 2 radiating an incident light to the main sensing body 1 from a distance and circling along with and about the main sensing body 1 with that distance as a radius (mutual movement of X and Y axes); and at the same time the main axis 41 reciprocating up and down along with the main sensing body 1 (up and down movement of linear axis Z)(see FIGS. 12B and 12C) such that the first sensor sub-element 111 outputs a signal informing the position of the incident light.

As shown in FIG. 3, FIG. 7, FIG. 11A to 11F, FIG. 13 and FIG. 13A, the present invention provides a measurement means of structural deviation from three linear reference axes and two rotational reference axes in which X, Y and Z axes are the linear axes and the vertical axis 221 of the revolving member 22 is a rotational reference axis with a measuring passage in the first direction, and the horizontal axis 231 of the dynamo 23 on the working platform 42 as the other reference rotational axis with a measuring passage in the second direction. The steps of dynamic (the main sensing body 1 is fixed to the main axis 41 with the driving device 3) measuring method are as follows: radiating the incident light of the lighting unit 2 on the first sensor sub-element 111 of the main sensing body 1; revolving the main sensing body 1 with the motor 31 of the driving member 3; the vertical axis 221 of the revolving member 22 revolving the light source 21 in the first direction; the lighting unit 2 radiating an incident light on the main sensing body 1 from a distance and circling along with and about the main sensing body 1 with that distance as a radius (mutual movement of X and Y axes); at the same time reciprocating up and down the main axis 41 along with the main sensing body 1 (up and down linear motion of Z axis, the main axis 41 makes horizontal movement if necessary); the horizontal axis 231 of the dynamo 23 driving the light source 21 in the second direction and the vertical axis 221 of the revolving member 22 to rock with a predetermined angle and frequency in the first direction (the rocking center of the dynamo0 23 rotates in the second direction); radiating the light on the first to third sensor sub-elements 111, 112 and 113 (see FIGS. 13B and 13C) such that all sensor elements output a signal informing the position of the incident light.

As shown in FIG. 3, FIG. 14 through FIG. 17A to 17E, the present invention provides a measuring means of structural deviation from three linear reference axes and two rotational reference axes in which X, Y and Z axes are the linear axes and the horizontal axis 231 of the driving device 3 with a measuring passage in the second direction, and the horizontal axis 231 of the dynamo 23 on the working platform 42 with a measuring passage in the second direction are the two rotational axes. The steps of dynamic (the main sensing body 1 is fixed to the main axis 41 with the driving device 3) measuring method are as follows: radiating the incident light of the lighting unit 2 on the first sensor sub-element 111 of the main sensing body 1; revolving the main sensing body 1 with the motor 31 of the driving member 3; the vertical axis 221 of the revolving member 22 revolving the light source 21 in the first direction; the lighting unit 2 radiating an incident light on the main sensing body 1 from a distance and circling along with and about the main sensing body 1 with that distance as a radius (mutual movement of X and Y axes); at the same time the driving device 3 driving the main sensing body 1 to rock with a predetermined angle and frequency (the rocking center of the driving device 3 revolves in the second direction); the horizontal axis 231 of the dynamo 23 driving the light source 21 in the second direction and the vertical axis 221 of the revolving member 22 to rock with a predetermined angle and frequency in the first direction (the rocking center of the dynamo 23 rotates in the second direction); radiating the light on the first sensor sub-element 111 to let it output a signal informing the position of the incident light.

As it is described above, the main sensing body 1 employed by the present invention can carry out a non-contact measurement with high optical resolution, it has the merit of easy to install with low cost compared with the traditional one.

The measurement means of the present invention is applicable to test all working machines. The standards of the measurement are:

1. Linear positioning repeated precision: ±1 um (±3σ), uncertainty: ±3 um.

2. Angle positioning repeated precision: ±1 arcsec (±3σ), uncertainty: ±3 arcsec 3. The above standard data may be changed according to the specification of the working machine, the scope of measurements is within the operation range of the working machine.

What is claimed is:

1. Means for measuring a working machine's structural deviation from five reference axes, comprising:

a main sensing body bonded with a main axis of a working machine to be driven to rotate and having a plurality of differently inclined sensor elements annularly disposed about said main axis, each of said sensor elements containing at least a first, a second and a third sensor sub-elements, wherein said first sensor sub-element is parallel to said main axis, said second and said third sensor sub-elements are respectively disposed at two sides of said first sensor sub-element and each making an inclined angle with said first sensor sub-element; and a lighting unit having a light source, and a revolving member to revolve said light source along a first direction of said sensing body, and a dynamo to connect said light source with said revolving member to revolve along a second direction of said main sensing body.

2. Means of claim 1, wherein said dynamo is entrained on a working platform so as to drive said light source and said revolving member to rock with a predetermined angle and frequency with respect to a rocking center.

3. Means of claim 1, wherein said main sensing body is composed of more than three sensor elements to form a polyhedron.

4. Means of claim 1, wherein said sensor elements are uniformly distributed around an exterior surface of said main sensing body with an equal angle span.

5. Means of claim 1, wherein there are two more first sensor sub-elements and least one first sensor sub-element is transversely disposed on at least one side of the other first sensor sub-element, and inclined with an angle.

6. Means of claim 1, wherein there are plural first sensor sub-elements transversely distributed around an exterior surface of said main sensing body with an equal angle span.

7. Means of claim 1, wherein there are plural second and third sensor sub-elements longitudinally distributed at two sides of said first sensor sub-element with an inclined angle.

8. Means of claim 1, wherein said main sensing body is bonded with said main axis of said working machine, and is controlled to revolve by said main axis.

9. Means of claim 1, wherein said main sensing body is bonded with a driving device which is further bonded with said main axis so as to drive said main sensing body to rock with a predetermined angle with respect to a rocking center.

10. Means of claim 1, wherein said lighting unit is entrained on a working platform of said working machine to vertically output an optical signal thereof to said sensor elements following a rocking angle of said main sensing body.

11. Means for measuring a working machine's structural deviation from five reference axes comprising a main sensing body bonded with a main axis of said working machine, and a lighting unit set aside of said main sensing body, wherein said lighting unit is circling about said main sensing body with a radius such that as soon as said main sensing body has detected an optical signal, and the optical signal is converted to an error signal informing of said working machine's structural deviation in two or three dimensional displacement from five reference axes.

12. Means of claim 11, wherein said lighting unit further comprises a light source, a revolving member and a dynamo, and said dynamo is entrained on a working platform such that said light source and said revolving member are able to rock with a predetermined rocking angle and frequency with respect to a rocking center under driving of said dynamo.

13. Means of claim 11, wherein said main sensing body further comprises a plurality of sensor elements disposed uniformly around an exterior surface of said main sensing body with an equal angle span.

14. Means of claim 11, wherein said sensor element has at least a first, a second and a third sensor sub-elements, and said second and third sensor sub-elements are respectively disposed at two sides of said first sensor sub-element with an inclined angle therebetween.

15. Means of claim 11, wherein said sensor element has at least a first, a second and a third sensor sub-elements, said second and third sensor sub-elements are respectively longitudinally disposed at two sides of said first sensor sub-element with an inclined angle therebetween.

16. Means of claim 11, wherein said main sensing body is further bonded with a driving device which is bonded with the main axis of said working machine such that said main sensing body is able to rock with a predetermined rocking angle with respect to a rocking center under driving of said driving device.

17. Means for measuring a working machine's structural deviation from five reference axes comprising a main sensing body being controlled by a main axis of said working machine to revolve; and a lighting unit set aside of said main sensing body, wherein said lighting unit is circling along with, and about said main sensing body with a radius such that as soon as said main sensing body has detected an optical signal, and the optical signal is converted to an error signal informing of said working machine's structural deviation in two or three dimensional displacement from five reference axes.

18. Means of claim 17, wherein said lighting unit further comprises a light source, a revolving member and a dynamo, and said dynamo is entrained on a working platform such that said light source and said revolving member are able to rock with a predetermined rocking angle and frequency with respect to a rocking center under driving of said dynamo.

19. Means of claim 17, wherein said sensor element has at least a first, a second and a third sensor sub-elements, and said second and third sensor sub-elements are respectively disposed at two sides of said first sensor sub-element with an inclined angle therebetween.

20. Means of claim 17, wherein said main sensing body is further bonded with a driving device which is bonded with a main axis of said working machine such that said main sensing body is able to rock with a predetermined rocking angle with respect to a rocking center under driving of said driving device.

* * * * *